United States Patent [19]

Gortsema et al.

[11] Patent Number: 4,995,964

[45] Date of Patent: * Feb. 26, 1991

[54] MIDBARREL HYDROCRACKING PROCESS EMPLOYING RARE EARTH PILLARED CLAYS

[75] Inventors: Frank P. Gortsema, Pleasantville, N.Y.; John R. McCauley, Louisville, Md.; Regis J. Pellet, Croton on Hudson, N.Y.; James G. Miller, Pearl River, N.Y.; Jule A. Rabo, Armonk, N.Y.

[73] Assignee: UOP, Des Plaines, Ill.

[ * ] Notice: The portion of the term of this patent subsequent to Dec. 25, 2007 has been disclaimed.

[21] Appl. No.: 154,834

[22] Filed: Feb. 26, 1988

Related U.S. Application Data

[63] Continuation-in-part of Ser. No. 21,972, Mar. 5, 1987.

[51] Int. Cl.$^5$ ...................... C10G 47/00; C10G 47/12
[52] U.S. Cl. .................................. 208/112; 502/84; 208/111
[58] Field of Search ...................... 208/111, 112, 114; 502/84

[56] References Cited

U.S. PATENT DOCUMENTS

| | | | |
|---|---|---|---|
| 3,842,121 | 10/1974 | Ichikawa et al. | 269/449 |
| 3,844,975 | 10/1974 | Karol | 502/117 |
| 3,847,963 | 11/1974 | Lalancette | 260/449 |
| 3,962,135 | 6/1976 | Alafandi | 502/84 |
| 4,176,090 | 11/1979 | Vaughan et al. | 502/63 |
| 4,216,188 | 8/1980 | Shabtai et al. | 423/118 |
| 4,238,364 | 12/1980 | Shabtai | 502/65 |
| 4,248,739 | 2/1981 | Vaughan et al. | 502/84 |
| 4,271,043 | 6/1981 | Vaughan et al. | 502/81 |
| 4,324,695 | 4/1982 | Hinnenkamp | 502/185 |
| 4,325,847 | 4/1982 | Lim et al. | 502/68 |
| 4,367,163 | 1/1983 | Pinnavaia et al. | 518/715 |
| 4,436,832 | 3/1984 | Jacobs et al. | 502/84 |
| 4,452,910 | 6/1984 | Hopkins et al. | 502/84 |
| 4,452,911 | 6/1984 | Eccles et al. | 502/100 |
| 4,469,813 | 9/1984 | Gaaf et al. | 502/260 |
| 4,510,257 | 4/1985 | Lewis et al. | 502/63 |
| 4,515,901 | 5/1985 | Elattar | 502/63 |
| 4,579,832 | 4/1986 | Shabtai et al. | 502/84 |
| 4,593,135 | 6/1986 | Gregory | 585/246 |
| 4,637,991 | 1/1987 | Battiste et al. | 502/68 |
| 4,637,992 | 1/1987 | Lewis et al. | 502/84 |
| 4,666,877 | 5/1987 | Vaughan | 502/84 |
| 4,753,909 | 6/1988 | Bousquet et al. | 502/84 |
| 4,757,040 | 7/1988 | Guan et al. | 502/84 |
| 4,761,391 | 8/1988 | Occelli | 502/63 |
| 4,775,461 | 10/1988 | Harris et al. | 258/120 |
| 4,859,648 | 8/1989 | Landis et al. | 502/84 |
| 4,952,544 | 8/1990 | McCauley | 502/68 |

FOREIGN PATENT DOCUMENTS

| | | |
|---|---|---|
| 1102703 | 5/1961 | Fed. Rep. of Germany . |
| 2555467 | 5/1985 | France . |
| WO5855332 | 4/1983 | Japan . |
| 083970 | 7/1983 | United Kingdom . |
| 130055 | 1/1985 | United Kingdom . |
| 2151603 | 7/1985 | United Kingdom . |
| WO8513015 | 7/1985 | United Kingdom . |
| WO8513016 | 7/1985 | United Kingdom . |

OTHER PUBLICATIONS

Lahav, Shani, and Shabtai, Clay and Clay Minerals, 1978, 26(2), 107–116.

Brindley and Sempels, Clay Minerals, 1977, 12, 220, Zirconium Oligomers.

Yamanaka, and Brindley, Clay and Clay Minerals, 1979, 27(2), 119.

Imelik, B. et al., "Catalysts by Acids and Bases", Elsevier Science Publishers, Amsterdam, The Netherlands, 1985.

Occelli, M. L., Ind. Eng. Chem. Prod. Res., Dec. 1983, 22 (553).

Baes, C. F., Jr., and Mesmer, R. E., "The Hydrolysis of Cations", John Wiley & Sons Inc., New York, N.Y., 1976.

Plee, D. et al., J. Am. Chem. Soc., 1985, 107, 2362.

Occelli, M. L. et al., J. Lat. (1984), 90, 256–260.

Shabtai, Massoth, Tokarz, Tasai and McCauley, 8th Int'l. Congress on Catalysts (Jul. 2–6, 1984), Proceedings, vol. IV, pp. 735–745.

McCauley, J., "Catalytic Cracking Properties of Cross-Linked Montmorillonite (CLM) Molecular Sieves", MSc. Thesis, University of Utah, Salt Lake City, Utah, 1983.

Tokarz, M. and J. Shabatai, Clays and Clay Minerals, vol. 3, No. 2, (1985), pp. 89–98.

Pinnavaia, T. J., "Intercalated Clay Catalysts", Science, vol. 220, pp. 365–371, (1983).

Pinnavaia, T. J., "New Chromia Pillared Clay Catalysts", J. Am. Chem. Soc., (1985), 107, pp. 4783–4785.

Chemical Abstracts, vol. 98, 1983, Para. 98: 114423u.
Chemical Abstracts, vol. 104 (1986), Para: 104:189202x.
Chemical Abstracts, vol. 104: (1986), Para: 104:50491x.
Chemical Abstracts, vol. 104, (1986), Para: 104:96367q.
Chemical Abstracts, vol. 104, (1986), Para: 104:88077e.
Chemical Abstracts, vol. 102, (1985), Para: 102:45425h.

(List continued on next page.)

Primary Examiner—Anthony McFarlane
Attorney, Agent, or Firm—Thomas K. McBride; John F. Spears, Jr.

[57] ABSTRACT

In the process for hydrocracking hydrocarbons boiling above about 700° F. to midbarrel fuel products boiling between about 300° F. and about 700° F. which includes contacting the hydrocarbons with hydrogen under effective hydrocracking conditions in the presence of a catalyst composition comprising at least one hydrogenation component and at least one cracking component, the improvement which comprises utilizing as the cracking component an expanded clay including pillars comprising (a) at least one pillaring metal, (b) at least one rare earth element and (c) oxygen located between the sheets of at least one clay mineral or synthetic analogue thereof.

69 Claims, No Drawings

OTHER PUBLICATIONS

Kikuchi, Ehchi, et al., J. Cat., (1979), 57, 27–34.
Leoppert, Jr., et al., Clays and Clay Minerals, 27(3), 201–208 (1979).
Tsuitida and Kobayashi, J. Chem. Soc. Japan, (Pure Chem. Sec.), 64, 1268 (1943).
Inove, Osugi and Kanaya, J. Chem. Soc. Japan (Ind. Chem. Sec.), 61, 407 (1958).
H. W. Kohlschuter et al., Z. Znorg. Allgem. Chem., 248, 319 (1941).
T. G. Owe Berg. X. Anorg. Allgem. Chem., 269, 213 (1952).
A. Clearfield and P. A. Vaughan, Acta Cryst., 9, 555 (1956).
Ermakov, Marov and Balyaeva, Zh, Neorgan, Khim. 8, (7), 1923 (1963).
Muha and Vaughan, J. Chem. Phys. 33, 194–9, (1960).
R. Burch et al., J. of Cat., 97 (1986), pp. 503–510.
Hofmann et al., Z. Anorg. Allg. Chem., 212, 995–999 (1950).
Brindley, G. W. et al., Clays and Clay Minerals, 19, 399–404 (1971).
Ciapetta, F. G. and D. Henderson, Oil Gas J., (1967), 65, 88.
Chem. Abstracts, 104:23385j (1986).
Chem. Abstracts, 98:205105h (1983).
Chem. Abstracts, 91:185822q (1979).
Chem. Abstracts, 97:61674x (1982).
Chem. Abstracts, 97:41081y (1982).
Chem. Abstracts, 101:60883d (1984).
Chem. Abstracts, 102:81292w (1985).
Chem. Abstracts, 103:76773v (1985).
Chem. Abstracts, 103:201492f (1985).
Chem. Abstracts, 101:12744n (1984).
Chem. Abstracts, 101:217058p (1984).
Chem. Abstracts, 102:169262x (1985).
Chem. Abstracts, 104:53188q (1986).
Chem. Abstracts, 104:8412x (1986).
Chem. Abstracts, 104:147996d (1986).
Chem. Abstracts, 103:70903r.
Chem. Abstracts, 100:25199t.

4,995,964

MIDBARREL HYDROCRACKING PROCESS EMPLOYING RARE EARTH PILLARED CLAYS

RELATED APPLICATION

This application is a continuation-in-part of copending application Ser. No.021,972, filed Mar. 5, 1987, which is incorporated in its entirety by reference herein.

BACKGROUND OF THE INVENTION

The present invention relates in general to the catalytic conversion of hydrocarbons, and more particularly to the process for the catalytic hydrocracking of heavy hydrocarbon or petroleum feedstocks to midbarrel products using a catalyst comprising at least one of certain expanded clays. The process is efficient from the standpoints of conversion rates and selectivity for the desired middle distillates.

Catalytic midbarrel hydrocracking is a petroleum refining process of rapidly increasing importance due to the similarly rapid increase in the demand for middle-distillate fuels. In general the process comprises converting heavy hydrocarbon, e.g., petroleum, feedstocks boiling above about 700° F. to lower-boiling products which boil in the range of about 300° F. to about 700° F., e.g., diesel and turbine fuels and furnace oils. The catalysts employed are of the dual functional type and comprise a hydrogenation-dehydrogenation component, such as a Group VIII noble metal or a combination of Group VIII and Group VIB metals, together with an acidic cracking component, such as silica-alumina or a zeolitic aluminosilicate.

Of the solid acid components, it is generally considered that zeolitic aluminosilicates are the most active in the sense that they convert the highest fraction of feedstock to products under reasonable operating conditions. Activity, however, is only one of three essential properties of a midbarrel hydrocracking catalyst—the other two properties being selectivity, i.e. the tendency of the catalyst to produce desirable products exclusively, and stability which is a measure of the useful operating life of the catalyst.

Battiste, et al. U.S. Pat. No. 4,637,991 discloses hydrocracking with a catalyst including a clay expanded with pillars derived from aluminum hydroxy chloride. Battiste also discloses a method for preparing a pillared interlayered clay admixed with zeolite. Vaughn U.S. Pat. No. 4,666,877 discloses expanded smectite clays in which the pillars are made up of aluminum and one or more transition metals. Such expanded clays are disclosed as being useful in petroleum hydrocracking catalysts. European Patent Publication No. 0,180,513A discloses a hydrocracking catalyst including a bridged smectite clay the layers of which are held apart by spacers composed of oxides of one or more of B, Mg, Al, P, Si, Ti, Cr, Zr, Mo and W; and an acidic stabilized Y-type zeolite. None of these references disclose rare earth elements as part of the propping agent for the clay, nor do these references disclose steaming the expanded clay to improve catalytic performance.

SUMMARY OF THE INVENTION

It is, accordingly, a principal object of the present invention to provide a midbarrel hydrocracking catalyst and process which provide acceptable catalytic activity, selectivity and stability.

A new midbarrel hydrocracking catalyst and process have been discovered. The present catalyst comprises at least one hydrogenation component and at least one cracking component. The cracking component is an expanded clay including pillars comprising (a) at least one pillaring metal, (b) at least one rare earth element and (c) oxygen, which pillars are located, e.g., intercalated, between the sheets of at least one clay mineral or synthetic analogue thereof. This catalyst is particularly adapted for use in midbarrel hydrocracking.

DISCUSSION OF THE INVENTION

The present invention provides substantial advantages. For example, using the catalyst described above in midbarrel hydrocracking service provides an outstanding combination of catalyst activity and selectivity to useful and valuable middle distillate products, as well as providing very beneficial catalyst stability characteristics. The overall performance of various embodiments of the present invention compares favorably to known commercial catalysts containing zeolitic and/or amorphorous cracking components.

The expanded clays useful in the present invention possess outstanding catalytic activity and catalytic selectivity which are superbly suited for the hydrocracking of heavy feedstocks to midbarrel or middle distillate products. In addition, the presently useful catalysts can be synthesized from inexpensive, commercially-available material using relatively simple processing.

One primary advantage of the presently useful expanded clays is the larger gallery spacing, i.e., the spacing between the sheets of the expanded clay, relative to expanded clays with pillars of only aluminum and oxygen. The larger gallery spacing facilitates selective conversion of relatively bulky feed molecules to midbarrel or middle distillate products. Further, the preferred hydrothermally stable expanded clays useful in the present invention do not have the prior art problem of their pillars collapsing at temperatures greater than the dehydroxylation temperature.

The present midbarrel hydrocracking process involves the use of a unique catalyst composition. The cracking component of this catalyst is composed of an expanded clay with a multiplicity of pillars located, e.g., intercalated, between the sheets of the clay. The pillars are composed of aluminum, at least one rare earth element and oxygen. The aluminum can be replaced in part or total by other suitable pillaring metals, such as chromium and zirconium. The product has relatively large pores and possesses considerable gallery volume. The pillars maintain the spacing of the expanded sheets of the clay even at temperatures as high as 1000° F. or even 1400° F., with the expanded clay maintaining a substantial portion its surface area and hydrocracking catalytic activity. In one embodiment, this expanded clay can be described as a molecular sieve framework prepared by intercalating clay sheets with oligomeric species. Upon intercalation, the clay is dried and subjected to heat treatment to stabilize the expanded sheets. The open, porous network of the expanded clay is stabilized by the aluminum-rare earth element-oxygen structures between the sheets of the clay. These structures or pillars comprise (i) aluminum or other pillaring metal(s), (ii) rare earth element(s) and (iii) oxygen. While the pillars preferably contain aluminum, other pillaring metals (for example, Zr and Cr) can be used.

The term "intercalation" as used herein is a term of art which indicates the insertion of a material between the sheets of a clay substrate. Leoppert, Jr., et al., Clays and Clay Minerals, 27(3), 201–208 (1979), is an example of a reference which uses this term in the same way it is used herein.

The presently useful expanded clays can be prepared by intercalating expandable clay minerals with oligomers derived from rare earth salts, in particular trivalent rare earth salts, and polyvalent cations of pillaring metals, such as $Al^{+3}$. Such oligomers can be produced by the hydrolysis and oligomerization of such polyvalent cations in combination with the rare earth component. Other preparation methods, other pillaring metals and rare earth salts having other oxidation states can be used.

The expanded clay useful in the present invention has gallery spacings preferably greater than about 10Å, more preferably greater than about 12Å. In one embodiment, the gallery spacing is preferably in the range of about 12Å to about 40Å and more preferably in the range of about 16Å to about 20Å, although the gallery spacings can be as low as about 10Å or as large as about 50Å. (Different expanded clays will provide different gallery spacings.) The gallery spacing achieved with montmorillonite is preferably montmorillonite expanded with aluminum-oxygen pillars has a reported gallery spacing of about 8.5Å, the inclusion of a rare earth element with the aluminum and oxygen in the pillars doubles the gallery spacing over the Al—O expanded clay. The relatively large gallery spacing of the presently useful expanded clays provides very useful cracking components for midbarrel hydrocracking catalysts.

The clays employed in preparing the expanded clays useful in the present invention are preferably crystalline, expandable, colloidal clays or clay minerals, and more preferably have ion exchange capacity. The clays preferably are of the three-sheet type, namely, sheet structures composed of two sheets of silica tetrahedrons and one central alumina dioctahedral or trioctahedral sheet. This type of clay includes equidimensional expanding lattice forms (e.g., montmorillonite and sauconite) and the elongate expanding lattice forms (e.g., montronite, saponite and hectorite). The useful clays can be natural or synthetic forms.

The invention is especially useful with clays which are swellable clays generally known as smectites. The unit layer or structure of a smectite, such as, montmorillonite, is composed of two silica tetrahedral sheets and a central alumina octahedral sheet. Such type of clay is termed a 2:1 layered clay. The simplified formula, without considering lattice substitutions, is $Si_8Al_4O_{20}(OH)_4 \cdot nH_2O$, wherein n is usually a whole number. In reality, however, there are isomorphic substitutions within the lattice, e.g., replacement of aluminum by magnesium or iron, and in particular, substitution of silicon by aluminum. This leads to a net negative charge on the smectite sheets which is compensated for by exchangeable cations situated between the unit layer. The preferred smectite clays have a sheet charge, x, of about 0.5 to about 1.

The clays are usually associated with a metal, such as the alkali metals, the alkaline earth metals, the rare earth metals, Ni, Fe, Cr, Be, Ti, B and the like and mixtures thereof. Preferably, the clay is associated with at least one of the alkali metals, in particular sodium. For example, the montmorillonite used preferably has a high sodium concentration rather than calcium because the former provides easier ion exchange and better sheet expansion.

Another embodiment of the invention provides that the expanded clays contain different combinations of catalytic components and/or ions which have been incorporated inside of the interlamellar space thereof. In other words, catalytic activity may be provided in such interlamellar space by incorporating components consisting of different catalytically active transition metal derivatives or combinations thereof, such as, for example, hydroxo-M or sulfhydro-M oligomers or oligomeric cations where M is one or different combinations of molybdenum, chromium, nickel, cobalt, tungsten or other transition metal, and/or simple mono or binuclear transition metal ions, such as, those of nickel, cobalt, molybdenum, chromium or other transition metals in such interlamellar space. Such expanded clays possess substantial hydrothermal stability, and high activity for hydrocracking of organic molecules present in heavy petroleum fractions, synthetic fuels and other heavy oils.

The average inter-pillar spacing, i.e., the average lateral distance between adjacent pillars, of the expanded clays useful in the present invention preferably is in the range of about 11Å to about 35Å, and can be varied by controlling the amount of propping agent, i.e., the material from which the pillars of the expanded clay are derived, and clay in the preparation of the expanded clay.

The clay used in preparing the expanded clay can be ion exchanged with at least one transition metal. Alternatively, the propping agents used in preparing the expanded clay can be isomorphically substituted with at least one transition metal during the formation of the propping agents, e.g., oligomers. The expanded clay can be ion exchanged or isomorphically substituted with at least one transition metal. This can be achieved by, for example, contacting the expanded clay with a solution of a soluble compound of at least one transition metal in a solvent, such as water. If desired, the transition metal can be reduced, preferably after steaming the expanded clay, by contact with a reducing agent, e.g., hydrogen, at effective reducing conditions.

In preparing the presently useful expanded clays, rare earth containing cationic hydroxo inorganic metal oligomers are preferably utilized as the propping agent. The preferred oligomers are basic and are formed by the hydrolysis of pillaring metal salts, for example aluminum salts, zirconium salts, and chromium salts. The more preferred oligomers are formed by the hydrolysis of aluminum salts, in particular chlorhydrol.

The aluminum, zirconium and chromium-containing oligomers can be used alone or in various combinations. Any species, such as a cation, anion or colloidal material, which can exist at the concentration and pH of the pillaring metal-containing composition (e.g., aluminum, zirconium or chromium salt) and is oligomerizable can be incorporated into the structure of the oligomer. Preferably, the species acts to obstruct or inhibit cation migration, which is believed to stabilize the structure of the expanded clay.

A suitable class of the inorganic aluminum-containing oligomers for use in providing the pillars of the presently useful expanded clays are those having the general formula $Al_{2+n}(OH)_{3n}X_6$, wherein n has a value of about 4 to about 12, and X is usually Cl, Br and/or $NO_3$. These inorganic aluminum-containing oligomers are generally believed to have an average molecular weight of the order of about 2000 or larger.

The preparation of the above-noted aluminum- and zirconium-containing oligomers is generally known to those skilled in the art.

Chromium-containing oligomers can be prepared by combining a chromium salt with a hydroxyl ion source in a liquid medium, e.g., solution. This mixture is aged to allow formation of a sufficient concentration of cationic oligomers. In preparing chromium oligomers, chromium salts suitable for use include the hydrated forms of chromium nitrate, chromium sulfate, and chromium chloride. The ratio of chromium salt to liquid medium, e.g., water, is obtained by determining the concentration of chromium oligomer necessary to produce a measurable amount of clay sheet expansion. The preferred salt is chromium nitrate and the preferred liquid medium is water. Suitable hydroxyl ion sources include solutions containing ammonia, lithium hydroxide, sodium hydroxide and potassium hydroxide. The preferred combination is chromium nitrate and ammonia. When using a solution containing ammonia as the hydroxyl ion source, the upper limit on pH is the highest pH attainable using concentrated ammonia-containing solution. However, when using LiOH, NaOH or KOH as the hydroxyl ion source, the total amount of added hydroxide is preferably kept below about 2 moles per mole of Cr ion in order to avoid precipitation of chromium oxide.

The aqueous mixture of at least one chromium salt and at least one hydroxyl ion source is preferably aged. Aging may not be needed if the clay and oligomer are initially well dispersed.

Oligomer formation, e.g., hydrolysispolymerization (oligomerization) can be conducted in the presence of a base or acid which changes the pH of the reaction mixture, preferably to a pH in the range of about 2.9 to about 4.0 for aluminum-containing oligomers. Bases, such as ammonium hydroxide and sodium hydroxide or a base forming reactant such as magnesium metal, are preferably added to the metal salt-containing aqueous medium in amounts in the range of about 0.5 to about 3 equivalents of base per equivalent of metal. Where the hydrolysis-polymerization reaction is conducted in the presence of a base, the reaction is preferably conducted at a temperature in the range of about 120° F. to about 212° F. for a period of time of about 0.1 to about 24 hours or more.

Furthermore, the oligomers can be prepared by cooligomerizing an aluminum, zirconium, chromium or other pillaring metal salt with a cooligomerizable reactant, such as $SiO_3^{-2}$, $ZrO_2^{+2}$ or $BPO_3^{+3}$, which can be included in the reaction mixture, for example, as sodium silicate, $ZrOCl_2$, zirconium chloride, boric acid or sodium borate. The use of molybdenum in the oligomer will provide a hydrogenation catalyst. The hydrolysis-polymerization reaction is preferably conducted in an aqueous medium which contains up to about 50 percent by weight of solids. This reaction is preferably conducted at temperatures on the order of about 40° F. to about 400° F. for periods of about 1 to about 100 hours. The reaction temperature and time are interdependent, so that an appropriate combination of these two variables is preferably employed.

In preparing the presently useful propping agents, the pillaring metal-containing oligomers are modified to include at least one rare earth therein.

Any suitable rare earth salt can be used in combination with the pillaring metal or metals, although water soluble rare earth salts are preferred. A preferred class of water soluble rare earth salts is selected from the group consisting of water soluble cerium salts, water soluble lanthanum salts and mixtures thereof. Rare earth metal halides, such as $CeCl_3$ and $LaCl_3$, are particularly preferred. In nature the rare earths usually occur in mixed form (with Ce being most plentiful and La next plentiful in such mixtures) and are expensive to separate. Accordingly, mixtures of rare earth salts are important in the invention from a commercial viewpoint.

The rare earth elements include the lanthanide series, i.e., elements with atomic numbers 57 through 71, plus yttrium and scandium. The lanthanide series includes La, Ce, Pr, Nd, Pm, Sm, Eu, Gd, Tb, Dy, Ho, Er, Tm, Yb and Lu.

Examples of suitable water-soluble rare earth salts include nitrates, halides, sulfates, selenates, oxalates, and acetates. The rare earth nitrates and chlorides are preferred because they are the most soluble of the rare earth salts in water. The rare earth salt preferably has at least a solubility constant, $K_{sp}$, which allows it to go into solution sufficiently to allow fast oligomer formation. The preferred water soluble rare earth salt is $Ce(NO_3)_3$.

Expanded clays having relatively large gallery spacings, such as those useful in the present invention, preferably include pillars which have enhanced stability against thermal degradation. Incorporation of rare earth into the structure of the presently useful propping agents provides expanded clays having relatively large gallery spacings and facilitates enhanced stabilization of the pillars against thermal degradation.

The synthesis of the oligomer is preferably conducted in an aqueous solution. The synthesis can be conducted in a non-aqueous organic or inorganic solvent. Examples of useful non-aqueous solvents are acetone (preferred), benzene, toluene, cyclohexane, hexamethysiloxane, ethyl ether, alcohols (such as methyl, ethyl, propyl, and benzyl alcohol), ketones (such as methyl isobutyl ketone), organic acids, organic acid anhydrides and esters, nitrobenzene, pyridine, ethylene glycol, dimethyl ether, tetrahydrofuran and acetonitrile. Preferably the non-aqueous solvent is a strongly polar solvent. The solvent is preferably substantially inert, i.e., with respect to the synthesis of the oligomer. Mixtures of solvents can be used. For example, one solvent can be used for the rare earth salt and another solvent for the pillaring metal salt. When different solvents are used, both solvents should be compatible or miscible.

The oligomer can be prepared in colloidal systems, provided that the pillaring metal or metals and the rare earth element have sufficient opportunity to react.

Generally, low Cl and iron levels in the final catalyst are desired. For example, iron is a poison that prevents or hinders desired hydrocarbon product formation and causes coke formation on the final catalyst. So Cl and iron are preferably removed from the oligomers by washing to as low levels as possible.

The weight ratio of rare earth (RE) to aluminum in the hydrolysis/polymerization reaction mixture and in the oligomers, measured as $REO_2:Al_2O_3$, typically ranges from about 1:52 to about 1:1 without any substantial detrimental effect on the expanded clay product. If the ratio is too lean in rare earth there is a negative effect on oligomer formation. The temperature for the oligomer formation reaction is preferably about 40° F. to about 400° F., more preferably about 180° F. to about 375° F. and still more preferably about reflux (reflux at about 223° F. for an aqueous chlorhydrol solution containing about 2.4Å by weight of solids) to about 295° F. Within such preferred temperature range, results can be observed within 24 hours. After 100 hours, the results are substantially identical to those with reaction times over 1000 hours. If the oligomer is cooled to room temperature, it is preferably reacted with the clay within one day to assure a good product (i.e., before the oligomer breaks down.) The ratio of oligomer to clay can vary resulting in different materials (i.e., partially or fully expanded clay), but optimum results are obtained with about 3 millimoles of pillaring metal, e.g., Al, per gram of clay.

Preferably, in preparing the expanded clay, the oligomer is first prepared in a liquid medium. The clay is preferably added to the oligomer, e.g., to form a clay solution, slurry, suspension, dispersion and the like. Thorough mixing is preferably employed. The solvents listed above for the oligomer formation can be used as the liquid medium to prepare the clay solution, slurry, suspension, dispersion and the like, with water being preferred.

The clay concentration in the final mixture, that is to say, after mixing of the oligomer-containing liquid medium and the initial clay suspension, should be sufficiently high to obviate the handling of large volumes of mixture, yet not excessively high since too high a clay concentration in the mixture would make the latter difficult to handle. The clay concentration in the final mixture preferably is in the range of about 1% to about 20% by weight.

If desired, a suitable suspension or flocculating agent can be used when the clay is to be in solution, slurry or suspension form. Swelling agents may also be employed. Swelling agents, that is, polar molecules, such as water, ethylene glycol and amines, substantially increase the distance between the sheets of clay. The swelling agent is believed to be absorbed into the intermellar space of the clay and acts to push apart the sheets of the clay. This facilitates properly placing the propping agent between the sheets of the clay.

The pH of the mixture containing the propping agent and clay may have to be adjusted to provide for optimum intercalation or expansion of the clay.

The propping agent, clay mixture may be aged for about 10 days or more at room temperature, but economic considerations are crucial in determining whether or not to age and for how long. Elevated temperatures, on the order of about 150° F., reduce the aging time period.

Adverse effects are obtained in the final catalyst from any Na, phosphate, Cl or Fe that is present. Such agents are preferably removed prior to aging the propping agent/clay mixture.

The clay can thereafter be separated from the liquid medium by conventional means, such as, by centrifugation, air-drying, freeze-drying or filtration.

The heating and/or calcining step (plus steaming step) are used to remove the solvent and fix the structure of the expanded clay. In one embodiment, the object is to decompose the hydrolyzed metal oligomers to pillars of stable inorganic oxides.

Calcination temperatures in the range of about 930° F. to about 1200° F. or higher are preferably employed for times ranging from about 0.5 hours to about 24 hours or more.

The expanded clay component of the catalyst composition is preferably subjected to steaming, i.e., to the action of steam or water vapor, to improve at least one catalytic property of the catalyst composition. Such steaming preferably acts to improve the selectivity of the hydrocracking catalyst composition to midbarrel fuel products. In other words, using a midbarrel hydrocracking catalyst which includes a steamed expanded clay component preferably results in an increased yield of midbarrel fuel products at a given or set feedstock conversion level relative to using a similar catalyst in which the expanded clay component has not been subjected to steaming.

The expanded clay may be subjected to steaming at any time after its formation. However, it is preferred that the expanded clay be steamed prior to the catalyst being formulated. In this manner, the steam can act to benefit the expanded clay without having any substantial or undue detrimental effect on the other components of the catalyst.

The expanded clay component is preferably subjected to steaming at elevated temperatures. Such steaming is more preferably conducted at a temperature in the range of about 930° F. to about 1500° F., still more preferably about 1020° F. to about 1380° F. for a period of time preferably in the range of about 0.1 hours to about 10 hours or more, more preferably about 0.5 hour to about 5 hours. Steaming at elevated temperatures also facilitates removing organic moieties in the clay.

The calcined expanded clays preferably have surface areas in the range of about 25 $m^2/g$ to about 600 $m^2/g$ or more, more preferably about 35 $m^2/g$ to about 300 $m^2/g$.

A representative way of preparing the expanded clays useful in the present invention is as follows. 5 parts by weight of 50 weight percent aluminum chlorhydroxide in water is mixed with 1 part of 60 weight percent $Ce(NO_3)_3$ in water. This solution is then placed in a teflon Parr bomb at 130° F. for 100 hours. The contents are then poured into 1000 parts by weight of $H_2O$ and, under high speed stirring, 7.5 parts by weight of bentonite is added. This mixture is allowed to age for about 10 days. The material is then filtered, redispersed with water for one or more additional times, and dried and calcined at 1200° F. for 16 hours. Any suitable and useful treatment and purification steps can be used. The resultant expanded clay has a relatively large gallery spacing and possesses catalytic activity and selectivity which is eminently suitable for midbarrel hydrocracking.

The invention includes a midbarrel hydrocracking catalyst which comprises an effective amount of at least one expanded clay, preferably present in an amount in the range of about 0.1% to about 90%, and more preferably about 1% to about 80%, by weight of the total composition. As noted above, the catalyst also includes an effective amount at least one hydrogenation component.

The hydrogenation component of the present catalyst composition is preferably selected from at least one component of a metal selected from the Group VIII platinum group metals, in particular platinum and palladium, the Group VIII iron group metals, in particular cobalt and nickel, the Group VI B metals, in particular molybdenum and tungsten, and mixtures thereof. If the feedstock has a sufficiently low sulfur content, e.g., less than about 1 weight percent and preferably less than about 0.5 weight percent, the Group VIII platinum group metals may be employed as the hydrogenation component. In this embodiment, the Group VIII platinum group metal is preferably present in an amount in the range of about 0.01 weight percent to about 5 weight percent of the total catalyst, based on elemental platinum group metal. When the feedstock being hydrocracked contains more than about 1.0 weight percent sulfur, the hydrogenation component is preferably a combination of at least one Group VIII iron group metal and at least one Group VI B metal. The non-noble metal hydrogenation components are preferably present in the final catalyst composition as oxides or sulfides, more preferably as sulfides. Preferred overall catalyst compositions contain at least about 5, preferably about 5 to about 40, weight percent Group VIB metal, more preferably molybdenum and/or tungsten, and at least about 0.5, and preferably about 1 to about 15, weight percent of Group VIII iron group metal, more preferably nickel and/or cobalt, determined as the corresponding oxides. The sulfide form of these metals is more preferred due to higher activity, selectivity and activity retention.

The hydrogenation components can be incorporated into the overall catalyst composition by any one of numerous procedures. They can be added to the expanded clay component and/or matrix materials, for example, by comulling, impregnation, ion exchange and the like.

Although the non-noble metal hydrogenation components can be combined into the catalyst as the sulfides, that is generally not the case. Such components are usually combined as a metal salt which can be thermally converted to the corresponding oxide in an oxidizing atmosphere or reduced with hydrogen or other reducing agent. The composition can then be sulfided by reaction with a sulfur compound such as carbon disulfide, hydrogen sulfide, hydrocarbon thiols, elemental sulfur, and the like.

Hydrogenation components can be incorporated at any one of a number of stages in the catalyst preparation. For example, metal compounds, such as the sulfides, oxides or water-soluble salts such as ammonium heptamolybdate, ammonium tungstate, nickel nitrate, cobalt sulfate and the like, can be added by co-mulling, impregnation or precipitation to either the clay component or the matrix material or the combination of both before the composite is finally calcined. In the alternative, these components can be added to the expanded clay/matrix material composite by impregnation with an aqueous, alcoholic or hydrocarbon solution of soluble compounds or precursors. Impregnation is the preferred technique.

In one embodiment, the catalyst further comprises at least one of a filler material and a binder material to provide a desired property or properties, e.g., desired catalyst dilution, mechanical strength and the like, to the catalyst. Such filler and binder materials, i.e., matrix materials, are to some extent porous in nature and may or may not be effective to promote midbarrel hydrocracking. Such matrix materials include, for example, synthetic and naturally occurring substances, metal oxides, clays (not expanded), silicas, aluminas, silica-aluminas, silica-magnesias, silica-zirconias, silica-thorias, silica-berylias, silica-titanias, silica-alumina-thorias, silica-alumina-zirconias, mixtures of these and the like.

If one or more matrix materials are included in the catalyst, the catalyst preferably contains no more than about 75%, more preferably no more than about 20%, by weight of such matrix materials.

The present catalyst may be prepared using catalyst manufacturing techniques and procedures which are conventional and well known in the art and, therefore, need not be discussed in detail here.

When refractory metal oxides such as alumina are present in the catalyst, any of the numerous well known techniques can be used to combine the same with the expanded clay component. For example the expanded clay component can be mulled with a hydrogel of the oxide followed by partial drying, if required, and extruding, pelletizing or the like to form particles of the desired shape. Alternatively, the refractory oxide can be precipitated in the presence of the expanded clay component. This is accomplished by increasing the pH of a solution of a refractory oxide precursor such as sodium aluminate, sodium silicate and the like. As described above, the combination can then be partially dried as desired, tableted, pelleted, extruded, or formed by other means and then calcined, e.g., at a temperature above about 600° F., usually above about 800° F.

The present catalysts are preferably present in the form of solid particles. The solid catalyst particles may be of any size functionally suitable in the present invention.

The present catalyst may include one or more zeolitic or non-zeolitic molecular sieves, although in one embodiment it is preferred that substantially no such molecular sieves are present. In other words, in this embodiment it is preferred that the catalyst be substantially free of such molecular sieves. However, the composition may include, for example, about 0.1 to about 40 weight percent of at least one zeolitic and/or non-zeolitic molecular sieve effective to promote the conversion, preferably hydroconversion such as hydrocracking and/or hydrodewaxing, of at least a portion of the feedstock at hydrocracking conditions. In one particularly useful embodiment, the catalyst includes at least one medium pore, acidic zeolitic or non-zeolitic molecular sieve in an amount effective to promote conversion of the feedstock (or intermediate products thereof) to provide at least one product, e.g., a diesel oil product, and preferably products boiling above such diesel oil product, having a reduced pourpoint, i.e., relative to such product or products produced utilizing a catalyst with no such medium pore, acidic molecular sieve.

In another useful embodiment, the present catalyst includes UHP-Y zeolite in an amount effective to promote the desired midbarrel hydrocracking. Such UHP-Y zeolite is described in U.S. Pat. No. 4,401,556, which is hereby incorporated in its entirety herein by reference. The present catalyst may include UHP-Y zeolite which has been modified by selective extraction in accordance with the procedure outlined in commonly assigned, U.S. patent application Ser. No. 130,559 filed Dec. 8, 1987, which application is hereby incorporated in its entirety herein by reference. This modified UHP-Y zeolite is preferably present in the catalyst in an amount effective to promote the desired midbarrel hydrocracking.

Zeolitic and non-zeolitic molecular sieves may be referred to as crystalline microporous three dimensional solid material or CMSMs. As used herein, the terms "zeolitic molecular sieves" and "non-zeolitic molecular sieves" further include the product or products derived from such molecular sieves, e.g., by processing, such as extracting, such molecular sieves. Such CMSMs, by definition, exclude the presently useful expanded clay components. Examples of such CMSMs include aluminosilicates, ALPOs, SAPOs, MeAPOs, MeSPSOs, ELAPOs, ELAPOs and the like. Certain of these CMSMs are discussed in U.S. Pat. Nos. 4,310,440; 4,440,871; 4,500,651; and 4,503,023, each of which patents is incorporated by reference herein. Certain of these CMSMs, e.g., the ALPOs, SAPOs, MeAPOs, MeAPSOs, ELAPOs and ELAPSOs, can be described with reference to the following paragraph and table from: Flanigen et al., "Aluminophosphate Molecular Sieves and the Periodic Table," published in the New Developments and Zeolite Science Technology" Proceedings of the 7th International Conference, edited by Y. Murakami, A. Iijima and J. W. Ward, pages 103-112 (1986), which is incorporated in its entirety herein by reference.

The materials are classified into binary (2), ternary (3), quaternary (4), quinary (5), and senary (6) compositions based on the number of elements contained in the cationic framework sites of any given structure. A normalized $TO_2$ formula represents the relative concentration of framework elements in the composition, $(El_xAl_yP_z)O_2$, where El is the incorporated element and x, y and z are the mole fractions of the respective elements in the composition. Acronyms describing the framework composition are shown in Table I, e.g., SAPO=(Si, Al, P)$O_2$ composition. The structure type is indicated by an integer following the compositional acronym, e.g., SAPO-5 is a (Si, Al, P)$O_2$ composition with the type 5 structure. The numbering of the structure type is arbitrary and bears no relationship to structural numbers used previously in the literature, e.g., ZSM-5, and only identifies structures found in the aluminophosphate-based molecular sieves. The same structure number is used for a common structure type with varying framework composition.

TABLE I
ACRONYMS FOR FRAMEWORK COMPOSITIONS

| $TO_2$, T= | Acronym | $TO_2$, T= | Acronym | $TO_2$, T= | Acronym |
|---|---|---|---|---|---|
| Si,Al,P | SAPO | Me,Al,P,Si | MeAPSO | Other Elements: | |
| | | Fe,Al,P,Si | FAPSO | El,Al,P | ElAPO |
| Me,Al,P | MeAPO | Mg,Al,P,Si | MAPSO | El,Al,P,Si | ElAPSO |
| Fe,Al,P | FAPO | Mn,Al,P,Si | MnAPSO | | |
| Mg,Al,P | MAPO | Co,Al,P,Si | CoAPSO | | |
| Mn,Al,P | MnAPO | Zn,Al,P,Si | ZAPSO | El = As,Be,B,Cr, Ga,Li,V,Ti | |
| Co,Al,P | CoAPO | | | | |
| Zn,Al,P | ZAPO | | | | |

In certain instances the catalyst composition preferably includes one or more such CMSMs to increase catalytic activity.

As noted above, one particularly useful group of CMSMs in the present invention are those CMSMs which provide reduced pourpoint products. These materials are medium pore, acidic CMSMs, preferably having a pore size of about 6Å. Included among the useful medium pore, acidic CMSMs are ZSM-5, silicalite, and SAPO- and MEAPO-11, -31, and -41, and mixtures thereof.

Methods for preparing many of such CMSMs are conventional and well known in the art. For example, crystalline aluminosilicate compositions can be made from alkali metal silicates and alkali metal aluminates so that they initially contain significant concentrations of alkali metals. Sodium tends to reduce the catalyst activity of the CMSM. Accordingly, most or all of the sodium in the crystalline aluminosilicate is removed or replaced, e.g., with other metal cations, such as aluminum ions or ions of the rare earths, which are associated with the crystalline aluminosilicates. This can be accomplished by contacting the crystalline aluminosilicate with a source of hydrogen ions such as acids, or hydrogen precursors such as ammonium compounds. These procedures are thoroughly described in U.S. Pat. No. 3,140,253 and Re. No. 27,639.

Compositions of the catalysts which are particularly useful in the present invention are those in which the CMSM is incorporated in an amount effective to promote the desired midbarrel hydrocracking and/or hydrodewaxing (product pourpoint reduction). The CMSM is preferably incorporated into the catalyst in an amount within the range of about 0.1% to about 40%, more preferably about 2% to about 30%, by weight of the total catalyst. The CMSM can be incorporated into the present catalysts using techniques which are conventional and well known in the art. Catalytically active CMSMs which are formed during and/or as part of the methods of manufacturing the catalyst are within the scope of the present invention.

The hydrocarbon feedstocks suitably treated in the present process boil primarily above about 700° F. Feedstocks having these characteristics include gas oils, vacuum gas oils, deasphalted residua, catalytic cracking cycle stocks, shale oil, tar sand oil, coal tars and liquids, and the like. The feed to the hydrocracking zone generally contains at least about 5 ppm and usually between about 10 ppm and 0.1 weight percent nitrogen as organonitrogen compounds. It may also contain substantial amounts of mono- or polynuclear aromatic compounds corresponding to at least about 5 and generally between about 5 to about 40 volume percent aromatics.

Reaction temperatures exceed about 500° F., and are preferably at least about 600° F., and more preferably between about 720° F. and about 900° F. Hydrogen should be present in an amount of at least about 400, and preferably in the range of between about 2,000 and about 15,000 or more standard cubic feet per barrel of hydrocarbon feedstocks. Reaction pressures generally exceed about 200 psig and are preferably within the range of about 500 to about 3,000 psig. A liquid hourly space velocity less than about 15, in particular between about 0.2 and about 10, is preferably employed.

Overall conversion rate is primarily controlled by reaction temperature and liquid hourly space velocity. However, selectivity to mid-barrel distillate products is generally inversely proportional to reaction temperature. Selectivity is usually improved at higher pressures and hydrogen addition rates. Thus, the most desirable conditions for the conversion of a specific feed to a predetermined product can be best obtained by converting the feed at several different temperatures, pressures, space velocities and hydrogen addition rates, correlating the effect of each of these variables and selecting the best compromise of overall conversion and selectivity.

The following non-limiting examples illustrate certain aspects of the present invention.

EXAMPLE 1

Preparation of Expanded Montmorillonite

An oligomer suspension was prepared from a mixture of chlorhydrol and an aqueous solution of $Ce(NO_3)_3$. The weight ratio of aluminum to cerium was 5 to 1. The chlorhydrol was included as an aqueous solution containing 50% by weight chlorhydrol while the cerium content of the $Ce(NO_3)_3$ solution used was 20% by weight, calculated as $CeO_2$. This mixture was refluxed at 223° F. for 90 hours. A montmorillonite clay, sold by American Colloid under the trademark HPM-20, was dispersed in the resulting oligomer suspension and this dispersion was aged for three (3) days. The clay amounted to about 44% by weight of the total dispersion. After aging the clay was filtered, dried and calcined at 930° F. for 16 hours. The resulting expanded clay, identified as KM-419, had a gallery spacing of 18Å.

EXAMPLE 2

Preparation of Expanded Fluorhectorite

A mixture containing 95% by weight of an aqueous chlorhydrol solution (23.8% by weight based on $Al_2O_3$) and 5% by weight of an aqueous cerium nitrate solution (29.3% by weight based on $CeO_2$) was refluxed at 223° F. for 192 hours. 20 g of the refluxed material was diluted with 2 liters of water. 30 g of fluorhectorite clay was dispersed into the resulting mixture. This slurry was then filtered, the solids were redispersed in 4 liters of water and again filtered. The refiltered solids were dried and calcined at 930° F. for 16 hours to produce an expanded clay, identified as KM-608, having a gallery spacing of 14Å.

EXAMPLE 3

Preparation of Another Expanded Montmorillonite

An oligomer suspension was prepared from a mixture of chlorhydrol and an aqueous solution of $Ce(NO_3)_3$. The atomic ratio of aluminum to cerium in this mixture was 52 to one (1). This mixture was refluxed at 223° F. for 20 days. Montmorillonite clay, HPM-20, was dispersed in the resulting oligomer suspension and this dispersion was aged for two (2) days. The dispersion contained 3.0 mmoles aluminum per gram of clay. After aging, the clay was filtered, dried and calcined at 1000° F. for 16 hours. The resulting expanded clay, identified as KM-906, had a gallery spacing of 18Å and a surface area of 480 m²/g.

EXAMPLE 4

Preparation of Expanded Montmorillonite Clay Using Propping Agent Containing Only Aluminum Example 3 was repeated except that the mixture contained no $Ce(NO_3)_3$; the mixture was refluxed for eight (8) days; and the dispersion was aged for 27 days. After aging, the clay was filtered, dried, and calcined at 1400° F. for 16 hours. The resulting expanded clay, identified as KM-845, had a gallery spacing of 9Å.

EXAMPLE 5

Preparation of Midbarrel Hydrocracking Catalyst Including Expanded Clay

A catalyst was prepared by mixing 140 g of silica-alumina (American Cyanamide) with 20 g of KM-419. The silica-alumina had an overall composition of 55% by weight of $Al_2O_3$ and 45% by weight of $SiO_2$, and a surface area of between 550 and 625 m²/g. A description of the method of preparation of this material is given in U.S. Pat. Nos. 4,097,365 and 4,419,271, each of which patents are hereby incorporated in its entirety by reference herein.

This mixture was placed in a laboratory muller and mulled for 10 minutes. Peptized Catapal alumina, prepared by mixing 6 cc of concentrated nitric acid and 100 cc of water with 40 g of alumina, was added to the muller and the mulling carried out for an additional 10 minutes. The material was extruded into 1/16" pellets using a laboratory extruder, dried at 212° F. and calcined at 930° F. using the following heating schedule:

Room temperature to 430° F. in 1 hour
Hold at 430° F. for 1½ hours
Ramp from 430° F. to 930° F. in 1 hour
Hold at 930° F. for 2 hours The water adsorptive capacity of the extrudates was determined by soaking in water and was found to be 0.97 cc/gm. The composition of the extrudates at this point was as follows:

|  | wt % |
| --- | --- |
| KM-419 | 10 |
| Silica-alumina | 70 |
| Alumina | 20 |

The metal loading was designed to give 7% by weight NiO and 22% by weight $WO_3$, based on the finished catalyst weight. Metal loading solutions were prepared by dissolving 38.0 g of $Ni(NO_3)_2.6H_2O$ and 37.3 g of ammonia metatungstate, each in 60 cc of water. The two solutions were then combined and additional water added to give a total co-solution volume of 140 cc. 99.5 g (anhydrous equivalent weight) of the extrudates was added to the solution and the resulting mixture was agitated. After complete solution uptake, the extrudates were dried at 212° F. and calcined at 930° F. using the same heating schedule described above.

The final composition of the catalyst was:

|  | wt % |
| --- | --- |
| KM-419 | 7.1 |
| Silica-alumina | 49.7 |
| Alumina | 14.2 |
| NiO | 7 |
| $WO_3$ | 22 |

EXAMPLE 6

Preparation of Midbarrel Hydrocracking Catalyst Including Expanded Clay Steamed at 1110° F.

To a laboratory size muller was added 17.5 g steamed KM-419 clay and 123 g of the silica-alumina described in Example 5. The KM-419 clay had been treated previously at 1110° F. in 100% steam for 1 hour. After mulling for 15 minutes, peptized Catapal alumina, prepared by addition of a solution of 5 cc of concentrated nitric acid and 90 cc of water to 35 g of alumina, was added to the muller and the mulling was carried out for an additional 10 minutes. Enough water was added to the mulled mixture to bring it to an extrudable consistency. The material was extruded as 1/16" pellets, dried at 212° F. and calcined at 930° F. using the heating schedule described in Example 5. The water adsorptive capacity of the calcined extrudates was determined to be 0.7 cc/g. The calcined extrudates were sized to 10-14 mesh and porefilled to contain a final metal loading of 7% by weight NiO and 22% by weight WO$_3$ (finished catalyst basis). A nickel nitrate solution and ammonium metatungstate solution were prepared by dissolving 40.71 g of Ni(NO$_3$)$_2$.6H$_2$O and 39.98 g of ammonium metatungstate, each in 40 cc of water, mixing the two solutions together and adding additional water to give a total solution volume of 152 cc. 106.5 g (anhydrous equivalent weight) of the extrudates were added to the mixed Ni and W containing solution and the mixture was agitated. After complete solution uptake the metal loaded extrudates were dried at 212° F. and calcined at 930° F. using the heating schedule given in Example 5.

The final composition of the catalyst was:

|  | wt % |
|---|---|
| Steamed KM-419 | 7.1 |
| Silica-alumina | 49.7 |
| Alumina | 14.2 |
| NiO | 7 |
| WO$_3$ | 22 |

EXAMPLE 7

Preparation of Midbarrel Hydrocracking Catalyst Including Increased Amount of Expanded Clay Steamed at 1110° F.

This catalyst was prepared in the same manner as the catalyst described in Example 6, except that the KM-419 clay component concentration was increased to 20% by weight (ex metals). The metals were added by porefilling in the same manner as described in Example 6 to give a final concentration of 7% by weight NiO and 22% by weight WO$_3$. The metal loaded extrudates were dried at 212° F. and calcined at 930° F. using the heating schedule given in Example 5.

The final composition of the catalyst was:

|  | wt % |
|---|---|
| Steamed KM-419 | 14.2 |
| Silica-alumina | 49.7 |
| Alumina | 14.2 |
| NiO | 7 |
| WO$_3$ | 22 |

EXAMPLE 8

Preparation of Midbarrel Hydrocracking Catalyst Including Increased Amount of Expanded Clay Steamed at 1200° F.

A catalyst was formulated by mulling 140 g of the silica-alumina described in Example 5 and 40 g of KM-419 clay, previously steamed at 1200° F. in 100% steam for 1 hour, in a muller for 10 minutes. 20 g of Catapal alumina, peptized by adding a solution of 3 cc of concentrated nitric acid and 50 cc of water to the alumina, was added to the muller and mulled for an additional ten minutes. A sufficient quantity of water was added to the mulled mix to give an extrudable consistency. The material was formed into 1/16" extrudates, dried at 212° F. and calcined at 930° F. using the heating schedule described in Example 5. The water pore volume of the extrudates was determined to be 0.8 cc/g.

178 g (anhydrous equivalent weight) of the extrudates was porefilled to give a final metal concentration of 7% by weight NiO and 22% by weight WO$_3$ by dissolving 62.90 g of Ni(NO$_3$)$_2$.6H$_2$O and 66.63 g of ammonium metatungstate, each in 50 cc of water. The two solutions were combined and additional water added to give a total solution volume of 145 cc. The extrudates were poured into the co-solution and the mixture was thoroughly agitated. After complete solution uptake, the metal loaded extrudates were dried and calcined to 930° F. in air using the heating schedule described in Example 5.

The final composition of the catalyst was:

|  | wt % |
|---|---|
| Steamed KM-419 | 14.2 |
| Silica-alumina | 49.7 |
| Alumina binder | 7.1 |
| NiO | 7 |
| WO$_3$ | 22 |

EXAMPLE 9

Preparation of Midbarrel Hydrocracking Catalyst Including Expanded Fluorhectorite Clay A catalyst was formed by blending 130 g of the silica-alumina described in Example 5 with 40 g of KM-608, which had previously been steamed at 1110° F. in 100% steam for 1 hour, in a muller and mulling for 10 minutes. Peptized Catapal alumina, prepared by mixing 30 g of alumina with a solution formed by mixing 4 cc concentrated nitric acid with 75 cc of water, was added to the mulled mix and mulled for an additional 5 minutes. A sufficient quantity of additional water was added to the mulled mix to give an extrudable consistency. The material was extruded into 1/16" pellets which were dried at 212° F. and calcined at 930° F. using the heating schedule described in Example 5. The adsorptive capacity of the extrudates was 0.7 cc/g.

88.7 g (anhydrous equivalent weight) of the extrudates was porefilled with a Ni and W containing cosolution to give a metal loading of 7% by weight NiO and 22% by weight WO$_3$, based on the finished catalyst. The metal solutions were prepared by dissolving 33.92 g of Ni(NO$_3$)$_2$.6H$_2$O and 33.31 g of ammonium metatungstate, each in 30 cc of water. The two solutions were mixed and the total volume increased to 62 cc by the addition of water. The extrudates were added to the Ni and W co-solution and the mixture was agitated. Upon complete solution uptake the metal loaded extrudates were air dried at 212° F. followed by calcination to 930° F. using the heating schedule described in Example 5.

The final composition of the catalyst was:

|  | wt % |
|---|---|
| Steamed KM-419 | 14.2 |
| Silica-alumina | 49.7 |
| Alumina binder | 7.1 |
| NiO | 7 |

| | wt % |
|---|---|
| WO$_3$ | 22 |

EXAMPLE 10

Preparation of Midbarrel Hydrocracking Catalyst Including Another Sample of Expanded Clay A catalyst was prepared by blending 75 g of KM-906 clay which had been steamed in 100% steam at 1110° F. for 1 hour, with 45 g of the silica-alumina described in Example 5 in a laboratory size muller and mulling for 10 minutes. 30 g. of peptized alumina, prepared by adding a solution composed of 4.2 cc of concentrated nitric acid and 75 cc of water to the alumina, was added to the muller and the mulling operation carried out for an additional 10 minutes. A sufficient quantity of water was added to the mulled mix to give a material of extrudable consistency. The 1/16" extrudates were dried at 212° F. followed by an air calcination treatment at 930° F. using the heating schedule given in Example 5. The pore volume of the extrudates was determined to be 0.80 cc H$_2$O/g.

106.5 g (anhydrous equivalent weight) of the extrudates was porefilled with a nickel and tungsten-containing solution to give a finished catalyst containing 7% by weight NiO and 22% by weight WO$_3$. The metal loading solution were prepared by dissolving 27.14 g of Ni(NO$_3$)$_2$.6H$_2$O and 26.65 g of ammonium metatungstate, each in 30 cc of distilled water, mixing the two solutions and adding sufficient water to give a total volume 85 cc. The extrudates were added to the nickel and tungsten-containing co-solution and the mixture was agitated until the solution was completely taken up by the extrudates. The material was then dried at 212° F., followed by air calcination at 930° F. using the heating schedule given in Example 5.

The final composition of the catalyst was:

| | wt % |
|---|---|
| Steamed KM-419 | 35.5 |
| Silica-alumina | 21.3 |
| Alumina binder | 14.2 |
| NiO | 7 |
| WO$_3$ | 22 |

EXAMPLE 11

Preparation of Midbarrel Hydrocracking Catalyst Including Another Expanded Clay Steamed at 1110° F.

A catalyst, having a composition (ex metals) of 70% by weight silica-alumina, 20% by weight KM-845 clay and 10% by weight alumina, was prepared by mulling 105 g of the silica-alumina described in Example 5 with 30 g of KM-845 clay in a muller for 15 minutes. The KM-845 clay had previously been steamed at 1110° F. for 1 hour in 100% steam. Peptized Catapal alumina (15 g), prepared by the addition of a solution composed of 2 cc concentrated nitric acid and 40 cc of water to the alumina, was added to the muller, and the mulling process carried out for an additional 10 minutes. A sufficient amount of additional water was added to the mulled mix to bring the material to an extrudable consistency. This mixture was then extruded. The extrudates were dried at 212° F. and calcined at 930° F. using the heating schedule given in Example 5. The water adsorptive capacity of the extrudates was determined to be 0.80 cc/gm.

The calcined pellets were sized to 10–14 mesh and porefilled with Ni and W. The loading solutions were prepared by adding 36.64 g of Ni(NO$_3$)$_2$.6H$_2$O and 35.98 g of ammonium metatungstate, each in 35 cc of water, mixing the two solutions and adding additional water to give a total solution volume of 80 cc. 95 g (anhydrous equivalent weight) of the extrudates was added to the solution and the mixture was agitated. Upon complete solution uptake the metal loaded extrudates were dried at 212° F. followed by air calcination at 930° F. using the heating schedule given in Example 5.

The final composition of the catalyst was:

| | wt % |
|---|---|
| Steamed KM-419 | 14.2 |
| Silica-alumina | 49.7 |
| Alumina binder | 7.1 |
| NiO | 7 |
| WO$_3$ | 22 |

EXAMPLE 12

Preparation of Midbarrel Hydrocracking Catalyst Containing An Expanded Clay And a Zeolite Product A catalyst was prepared using KM-906 clay steamed at 1110° F. in 100% steam for 1 hour. The composition was prepared by mixing 105 g of the above material with 30 g of peptized Catapal alumina and 15 g of selectively extracted LZ-10 zeolite.

LZ-10 is the Union Carbide Corporation's designation for UHP-Y described in U.S. Pat. No. 4,401,556. The UHP-Y (LZ-10) is modified further by selective extraction in accordance with the procedure outlined in commonly assigned, U.S. patent application, Ser. No. 130,559 filed Dec. 8, 1987. Such extraction procedure acts to remove amorphorous occluded debris formed in the zeolite pores during the synthesis of the LZ-10 zeolite.

105 g of the steamed KM-906 clay and 15 g of the selectively extracted LZ-10 having a SiO$_2$/Al$_2$O$_3$ ratio of 11.3 were mulled together for 10 minutes in a laboratory size muller. 30 g of Catapal alumina, peptized by adding 4 cc of 20% concentrated nitric acid and 70 cc of water to the alumina, was added to the muller and the three components mulled together for an additional 10 minutes. Approximately 25 cc of additional water was added to the muller to bring the mixture to an extrudable consistency. The material was extruded into 1/16" pellets, dried at 212° F. and calcined at 930° F. using the heating schedule given in Example 5. The pore volume of the extrudates was determined to be 0.51 cc/gm. 112 g (anhydrous equivalent weight) of the extrudates was metal loaded by dissolving 42.8 g of Ni(NO$_3$)$_2$.6H$_2$O and 42.0 g of ammonium metatungstate, each in 25 ml of water, mixing the two solutions together and diluting to a total solution volume of 60 cc by the addition of water. The thoroughly mixed co-solution was poured into the extrudates, and the mixture was agitated. Upon complete solution uptake, the extrudates were air dried at 212° F. and calcined to 930° F. using the heating schedule described in Example 5. The final composition of the catalyst was:

|  | wt % |
|---|---|
| Select. Extracted LZ-10 | 7.1 |
| Steamed KM-906 | 49.7 |
| Alumina binder | 14.2 |
| NiO | 7 |
| WO$_3$ | 22 |

A summary of the compositions of the various expanded clay catalysts prepared in Examples 5 to 12 is given in Table II.

TABLE II

| Example | Clay Component[1] | Steaming Conditions[2] °F. | Propping Agent | Gallery Spacing, Å |
|---|---|---|---|---|
| 5 | 10% KM-419 | none | Cerium/Aluminum | 18 |
| 6 | 10% KM-419 | 1110 | Cerium/Aluminum | 18 |
| 7 | 20% KM-419 | 1110 | Cerium/Aluminum | 18 |
| 8 | 20% KM-419 | 1200 | Cerium/Aluminum | 18 |
| 9 | 20% KM-608 | none | Cerium/Aluminum | 14 |
| 10 | 50% KM-906 | 1110 | Cerium/Aluminum | 18 |
| 11 | 20% KM-845 | 1110 | Aluminum | 9 |
| 12 | 70% KM-906 | 1110 | Cerium/Aluminum | 18 |

[1] Wt % Concentration, ex metals
[2] in 100% steam for 1 hour

EXAMPLES 13 TO 21

Each of the catalysts prepared in Example 5 to 12 was tested in midbarrel hydrocracking service as follows.

The feedstock used in each of these tests was a heavy vacuum gas oil (HVGO) having the following properties:

Sulfur content, ppm. by weight 24,500±400
Nitrogen content ppm. by weight 800±100
IBP 700° F.
FBP 1050° F.
Pourpoint 95° F.
Specific Gravity @60° F. 0.9218

The extruded catalyst was crushed and sized to 12×14 mesh and diluted with 150 cc of 12×16 mesh quartz chips to give a total volume of 300 cc. This mixture was loaded in a stainless steel reactor as a plug between the quartz chips (approximately 300 cc on bottom).

After the catalyst was loaded, the reaction system was purged with nitrogen for 15 minutes at a flow rate of 5 SCF/hr., followed by purging with hydrogen. The hydrogen flow rate was then set at 2.65 SCF/hr. H$_2$S was introduced and adjusted to give a blend of 10% by volume of H$_2$S and 90% by volume of H$_2$. This flow was continued at ambient conditions for 16 minutes. The temperature was then raised to 450° F. at a rate of 50° F./hr, and held at 450° F. for 2½ hours. Then the temperature was ramped from 450° F. to 700° F. at a rate of 25° F./hr. and held at 700° F. for 2½ hours, followed by rapid cooling to 490° F. The H$_2$S flow was stopped, and the system was pressurized to 2000 psig. The feedstock was then introduced at a LHSV of 1.0 while maintaining a hydrogen flow rate equivalent to 10,000 SCF/BBL of feedstock. These conditions were maintained stable for 2½ hours to ensure complete wetting of the catalyst. The temperature was then ramped at 50° F./hr to the process conditions.

The temperature was varied to attain various conversion levels to bracket 60% conversion to diesel oil. Gas samples were taken during each mass balance period and analyzed for H$_2$ and C$_1$-C$_2$ gas component. The liquid product weight was measured and the specific gravity was determined. Samples were taken at each condition for simulated G.C. analysis to determine the 300° F., 500° F. and 700° F. cutpoints.

These data were analyzed to generate various relationships from which the following were obtained:
. % Diesel efficiency (selectivity to diesel oil at 60% conversion to diesel oil).
. % turbine efficiency (selectivity to turbine oil at 60% conversion to diesel oil).
. Turbine oil conversion at 60% conversion to diesel oil.

In addition, the reaction temperature required to achieve 60% diesel conversion after 240 hours in hydrocracking service was also determined.

Table III presents a summary of the results obtained from each of these catalysts. Also included in Table III is a results summary of a state of the art midbarrel hydrocracking catalyst prepared in accordance with the teachings of U.S. Pat. No. 4,419,271, which is hereby incorporated in its entirety herein by reference. This state of the art (SOTA) catalyst had the following composition:

|  | wt % |
|---|---|
| LZ-10 | 7.1 |
| Silica-alumina | 49.7 |
| Alumina binder | 14.2 |
| NiO | 7 |
| WO$_3$ | 22 |

TABLE III
MIDBARREL PERFORMANCE DATE

| EXAMPLE | T$_{240\ hrs.}$ | % Diesel$_{eff}$ | % Turbine$_{eff}$ |
|---|---|---|---|
| 5 | 764 ± 1.2 | 85.7 ± 0.9 | 79.8 ± 0.9 |
| 6 | 760 ± 5 | 87.2 ± 0.7 | 80.8 ± 0.9 |
| 7 | 755 ± 0.8 | 86.2 ± 0.7 | 80.2 ± 0.8 |
| 8 | 766 ± 0.6 | 86.7 ± 0.7 | 80.3 ± 0.9 |
| 9 | 765 ± 1.1 | 87.2 ± 0.6 | 81.0 ± 0.6 |
| 10 | 754 ± 0.6 | 88.4 ± 0.2 | 82.8 ± 0.2 |
| 11 | 769 ± 0.8 | 87.4 ± 0.3 | 81.3 ± 0.3 |
| 12 | 733 ± 3 | 85.7 ± 0.5 | 79.7 ± 0.7 |
| SOTA | 758 | 81.3 | 74.3 |

These data demonstrate that the expanded clay-containing catalyst compositions of the present invention have substantial utility as midbarrel hydrocracking catalysts. In general, these Examples demonstrate the unexpected advantages in catalytic activity and selectivity for midbarrel hydrocracking obtained using catalysts containing clays expanded with the rare earth and aluminum-containing pillars compared to similar catalyst containing clays that are expanded with propping agents lacking the rare earth component. Also illustrated is the additional advantage in catalytic activity and selectivity for midbarrel hydrocracking that is gained when the expanded clays useful in this invention are given a steam pretreatment. Further, these Examples show that catalysts prepared with these expanded clays are superior in selectivity to state of the art midbarrel hydrocracking catalysts while possessing comparable or increased activity.

Specifically, comparing the performance of the Example 5 catalyst with that of the SOTA catalyst, it can be seen that the Example 5 catalyst is only about 6° F. less active than the SOTA catalyst but is more than 4% more efficient at diesel production. This selectivity advantage is of enormous economic importance to a petroleum refiner.

Comparing Example 5 with the performance of the catalyst of Example 6 demonstrates the additional advantage to be gained in both catalytic activity and selectivity by applying a steam pretreatment to the presently useful expanded clay component prior to use in midbarrel hydrocracking service. The Example 6 catalyst is 4° F. more active than the Example 5 catalyst and is even more selective, giving 87.2 diesel efficiency, than the catalyst of Example 5, with a 85.7% diesel efficiency. The Example 6 catalyst is also very significantly more selective than the SOTA catalyst with almost no activity debit.

The catalyst of Example 10 shows that at even higher steamed expanded clay contents the activity debit relative to the SOTA catalyst can be completely eradicated and truly spectacular selectivity advantages relative to the SOTA catalyst can be achieved. Product selectivities indicated by 88% or greater diesel efficiency and 82% or greater turbine efficiency particularly when combined with the high activity demonstrated in Example 10 are novel and represent a true technological breakthrough.

Comparing Example 7 catalyst performance, representing the present invention, with the performance of the comparative catalyst of Example 11, one can see the surprising advantages to be obtained by use of a propping agent containing rare earth. The catalyst of Example 7 includes rare earth-containing pillars in its clay expanded component while the catalyst of Example 11 does not. The catalyst of Example 7 is 14° F. more active with only slightly lower selectivity that the catalyst of Example 11.

The catalyst of Example 12, which includes an increased amount of an expanded clay component in accordance with the present invention provides truly outstanding, and unexpectedly superior results in terms of both catalytic activity and selectivity, relative to the SOTA catalyst.

One substantial advantage of a high activity catalyst is that reduced hydrocracking temperatures can be employed. These reduced temperatures allow for more effective hydrogenation and ultimately provide high quality products which have reduced contents of aromatic hydrocarbons. The present catalysts not only have outstanding activity, but also superior activity stability and selectivity. Thus, the present invention provides high yields of good quality products over a prolonged, e.g., commercially viable, catalyst life.

In short, the present catalyst compositions which include expanded clay compositions containing rare earth metal have outstanding utility in midbarrel hydrocracking service.

While this invention has been described with respect to various specific examples and embodiments, it is to be understood that the invention is not limited thereto and that it can be variously practiced within the scope of the following claims.

What is claimed:

1. In a process for hydrocracking hydrocarbons boiling above about 700° F. to midbarrel fuel products boiling between about 300° F. and about 700° F. which includes contacting said hydrocarbons with hydrogen under effective hydrocracking conditions in the presence of a catalyst composition comprising at least one hydrogenation component and at least one cracking component, the improvement which comprises utilizing as said cracking component an expanded clay including pillars comprising (a) at least one pillaring metal, (b) at least one rare earth element and (c) oxygen located between the sheets of at least one clay mineral or synthetic analogue thereof.

2. The process as claimed in claim 1 wherein said pillaring metal is selected from the group consisting of aluminum, zirconium, chromium and mixtures thereof.

3. The process as claimed in claim 1 wherein said pillaring metal is aluminum.

4. The process as claimed in claim 1 wherein said rare earth element is a mixture of rare earth elements.

5. The process as claimed in claim 4 wherein said rare earth element mixture includes cerium and lanthanum.

6. The process as claimed in claim 1 wherein said rare earth element is cerium.

7. The process as claimed in claim 1 wherein said rare earth element is lanthanum.

8. The process as claimed in claim 1 wherein said clay mineral or synthetic analogue thereof is a smectite and said expanded clay has a gallery spacing of greater than about 10Å.

9. The process of claim 8 wherein said expanded clay has a gallery spacing of greater than about 12Å.

10. The process as claimed in claim 1 wherein said clay is selected from the group consisting of montmorillonite, bentonite, hectorite, fluorhectorite, saponite, montronite, sauconite and mixtures thereof.

11. The process as claimed in claim 1 wherein the said expanded clay has a gallery spacing in the range of about 10Å to about 50Å.

12. The process as claimed in claim 1 wherein the said expanded clay has a gallery spacing in the range of about 12Å to about 40Å.

13. The process as claimed in claim 1 wherein the said expanded clay has a gallery spacing in the range of about 16Å to about 20Å.

14. The process as claimed in claim 1 wherein said expanded clay has a surface area in the range of about 25 $m^2/g$ to about 600 $m^2/g$.

15. The process as claimed in claim 1 wherein said hydrogenation component is at least one component of a metal selected from the group consisting of the Group VIII platinum group metals, the Group VIII iron group metals, the Group VIB metals and mixtures thereof.

16. The process as claimed in claim 1 wherein said hydrogenation component is at least one component of a metal selected from the group consisting of the Group VIII platinum group metals and mixtures thereof.

17. The process as claimed in claim 1 wherein said hydrogenation component is at least one component of a metal selected from the group consisting of the Group VIII iron group metals, the Group VIB metals and mixtures thereof.

18. The process as claimed in claim 1 wherein said hydrogenation component includes at least one Group VIII iron group metal component and at least one Group VIB metal component.

19. The process as claimed in claim 1 wherein said expanded clay is present in said catalyst composition in an amount in the range of about 0.1% to about 90% by weight.

20. The process as claimed in claim 1 wherein said expanded clay is present in said catalyst composition in an amount in the range of about 1% to about 80% by weight.

21. The process as claimed in claim 1 wherein said expanded clay is subjected to steaming to improve selectivity of said catalyst composition.

22. The process as claimed in claim 21 wherein said expanded clay is subjected to said steaming prior to said catalyst being formulated.

23. The process as claimed in claim 21 wherein said steaming is conducted at a temperature in the range of about 930° F. to about 1500° F. for a period of time in the range of about 0.1 hours to about 10 hours.

24. The process as claimed in claim 21 wherein said steaming is conducted at a temperature in the range of about 1020° F. to about 1380° F. for a period of time in the range of about 0.5 hours to about 5 hours.

25. The process as claimed in claim 1 wherein said catalyst composition further comprises at least one matrix material.

26. The process as claimed in claim 25 wherein said matrix material is selected from the group consisting of alumina, silica-alumina and mixtures thereof.

27. The process as claimed in claim 1 wherein said hydrocracking conditions include a temperature in excess of about 500° F., an amount of hydrogen equal to at least about 400 standard cubic feet per barrel of hydrocarbons, a pressure in excess of about 200 psig., and a liquid hourly space velocity less than about 15.

28. The process as claimed in claim 1 wherein said hydrocracking conditions include a temperature in the range of about 720° F. to about 900° F., an amount of hydrogen equal to about 2,000 to about 15,000 standard cubic feet per barrel of hydrocarbons, a pressure in the range of about 500 psig to about 3,000 psig., and a liquid hourly space velocity in the range of about 0.2 to about 10.

29. The process as claimed in claim 16 wherein said Group VIII platinum group metal component is present in an amount in the range of about 0.01% to about 5% by weight of the total catalyst composition, based on elemental Group VIII platinum group metal.

30. The process as claimed in claim 17 wherein said Group VIII iron group metal component is present in an amount in the range of about 1% to about 15% by weight of the total catalyst composition, based on the metal oxide, and said Group VIB metal component is present in an amount in the range of about 5% to about 40% by weight of the total catalyst composition, based on the metal oxide.

31. In the process for hydrocracking hydrocarbons boiling above about 700° F. to midbarrel fuel products boiling between about 300° F. and about 700° F. which includes contacting said hydrocarbons with hydrogen under effective hydrocracking conditions in the presence of a catalyst composition comprising at least one hydrogenation component and at least one cracking component, the improvement which comprises utilizing as said cracking component an expanded clay including pillars comprising (a) at least one pillaring metal, (b) at least one rare earth element and (c) oxygen located between the sheets of at least one clay mineral or synthetic analogue thereof, provided that said expanded clay is steamed to improve selectivity of said catalyst composition.

32. The process as claimed in claim 31 wherein said expanded clay is subjected to said steaming prior to said catalyst being formulated.

33. The process as claimed in claim 31 wherein said steaming is conducted at a temperature in the range of about 930° F. to about 1500° F. for a period of time in the range of about 0.1 hours to about 10 hours.

34. The process as claimed in claim 31 wherein said steaming is conducted at a temperature in the range of about 1020° F. to about 1380° F. for a period of time in the range of about 0.5 hours to about 5 hours.

35. The process as claimed in claim 31 wherein said pillaring metal is selected from the group consisting of aluminum, zirconium, chromium and mixtures thereof.

36. The process as claimed in claim 31 wherein said pillaring metal is aluminum.

37. The process as claimed in claim 31 wherein said rare earth element is a mixture of rare earth elements.

38. The process as claimed in claim 31 wherein said rare earth element is cerium.

39. The process as claimed in claim 31 wherein said clay mineral or synthetic analogue thereof is a smectite and said expanded clay has a gallery spacing of greater than about 10Å.

40. The process as claimed in claim 39 wherein said expanded clay has a gallery spacing of greater than about 12Å.

41. The process as claimed in claim 31 wherein said clay is selected from the group consisting of montmorillonite, bentonite, hectorite, fluorhectorite, saponite, montronite, sauconite and mixtures thereof.

42. The process as claimed in claim 31 wherein the said expanded clay has a gallery spacing in the range of about 10Å to about 50Å.

43. The process as claimed in claim 31 wherein the said expanded clay has a gallery spacing in the range of about 12Å to about 40Å.

44. The process as claimed in claim 31 wherein the said expanded clay has a gallery spacing in the range of about 16Å to about 20Å.

45. The process as claimed in claim 31 wherein said hydrogenation component is at least one component of a metal selected from the group consisting of the Group VIII platinum group metals, the Group VIII iron group metals, the Group VIB metals and mixtures thereof.

46. The process as claimed in claim 31 wherein said hydrogenation component includes at least one Group VIII iron group metal component and at least one Group VIB metal component.

47. The process as claimed in claim 31 wherein said expanded clay is present in said catalyst composition in an amount in the range of about 0.1% to about 90% by weight.

48. The process as claimed in claim 31 wherein said hydrocracking conditions include a temperature in the range of about 720° F. to about 900° F., an amount of hydrogen equal to about 2,000 to about 15,000 standard cubic feet per barrel of hydrocarbons, a pressure in the range of about 500 psig to about 3,000 psig., and a liquid hourly space velocity in the range of about 0.2 to about 10.

49. The process as claimed in claim 46 wherein said Group VIII iron group metal component is present in an amount in the range of about 1% to about 15% by weight of the total catalyst composition, based on the metal oxide, and said Group VIB metal component is present in an amount in the range of about 5% to about 40% by weight of the total catalyst composition, based on the metal oxide.

50. In a process for hydrocracking hydrocarbons feedstocks boiling above about 700° F. to midbarrel fuel products boiling between about 300° F. and about 700° F. which includes contacting said hydrocarbons with hydrogen under effective hydrocracking conditions in the presence of a catalyst composition comprising at least one hydrogenation component and at least one cracking component, the improvement which comprises utilizing as said cracking component an expanded clay including pillars comprising (a) at least one pillaring metal, (b) at least one rare earth element and (c) oxygen located between the sheets of at least one clay mineral or synthetic analogue thereof, said catalyst further comprising at least one material selected from the group consisting of zeolite molecular sieves, nonzeolite molecular sieves and mixtures thereof, said material being effective to promote the conversion of at least a portion of said feedstocks.

51. The process as claimed in claim 50 wherein said material is a medium pore, acidic molecular sieve.

52. The process as claimed in claim 51 wherein said material has a pore size of about 6Å.

53. The process as claimed in claim 52 wherein said material is selected from the group consisting of ZSM-5, silicalite, SAPO-11, SAPO-31, MEAPO-11, MEAPO-31, MEAPO-41 and mixtures thereof.

54. The process as claimed in claim 50 wherein said material is selected from the groups consisting of UHP-Y, UHP-Y which has been selectively extracted to remove amorphorous debris formed in the pores of the UHP-Y during UHP-Y synthesis and mixtures thereof.

55. The process as claimed in claim 50 wherein said material is present in an amount in the range of about 0.1% to about 40% by weight of the total catalyst composition.

56. The process as claimed in claim 50 wherein said pillaring metal is selected from the group consisting of aluminum, zirconium, chromium and mixtures thereof.

57. The process as claimed in claim 50 wherein said pillaring metal is aluminum.

58. The process as claimed in claim 50 wherein said rare earth element is a mixture of rare earth elements.

59. The process as claimed in claim 50 wherein said rare earth is cerium.

60. The process as claimed in claim 50 wherein said clay mineral or synthetic analogue thereof is a smectite and said expanded clay has a gallery spacing of greater than about 10Å.

61. The process as claimed in claim 60 wherein said expanded clay has a gallery spacing of greater than about 12Å.

62. The process as claimed in claim 50 wherein said clay is selected from the group consisting of montmorillonite, bentonite, hectorite, fluorhectorite, saponite, montronite, sauconite, and mixtures thereof.

63. The process as claimed in claim 50 wherein the said expanded clay has a gallery spacing in the range of about 10Å to about 50Å.

64. The process as claimed in claim 50 wherein the said expanded clay has a gallery spacing in the range of about 12Å to about 40Å.

65. The process as claimed in claim 50 wherein the said expanded clay has a gallery spacing in the range of about 16Å to about 20Å.

66. The process as claimed in claim 50 wherein said hydrogenation component is at least one component of a metal selected from the group consisting of the Group VIII platinum group metals, the Group VIII iron group metals, the Group VIB metals and mixtures thereof.

67. The process as claimed in claim 50 wherein said hydrogenation component included at least one Group VIII ion group metal component and at least one Group VIB metal component.

68. The process as claimed in claim 50 wherein said expanded clay is present in said catalyst composition in an amount in the range of about 0.1% to about 90% by weight.

69. The process as claimed in claim 50 wherein said expanded clay is subjected to steaming to improve selectivity of said catalyst composition.

* * * * *